United States Patent [19]

Kitamura et al.

[11] Patent Number: 4,487,362
[45] Date of Patent: Dec. 11, 1984

[54] FIXTURE FOR THERMOSTATICALLY MIXING HOT AND COLD WATER

[75] Inventors: Yoshiaki Kitamura; Hitoshi Nomura; Tuyoshi Harada, all of Gifu, Japan

[73] Assignee: Kitamura Gokin Industrial Co., Ltd., Gifu, Japan

[21] Appl. No.: 484,554

[22] Filed: Apr. 13, 1983

[51] Int. Cl.³ .............................................. G05D 23/13
[52] U.S. Cl. .................................. 236/12.2; 236/12.21
[58] Field of Search ................. 236/12.20, 12.21, 12.22

[56] References Cited

U.S. PATENT DOCUMENTS

| | | | |
|---|---|---|---|
| 3,685,728 | 8/1972 | Chapou | 236/12.2 |
| 3,765,604 | 10/1973 | Trubert et al. | 236/12.2 |
| 3,929,283 | 12/1975 | Delpla | 236/12.2 |
| 3,955,759 | 5/1976 | Knapp | 236/12.2 |
| 4,029,256 | 6/1977 | Dauga | 236/12.2 |
| 4,185,771 | 1/1980 | Killias | 236/12.2 |

Primary Examiner—William E. Tapolcai
Attorney, Agent, or Firm—Wenderoth, Lind & Ponack

[57] ABSTRACT

A fixture for thermostatically mixing hot and cold water from hot- and cold-water pipes. The diameters of the annular axes of seals provided on both ends of a control valve are equal to the inside diameter of the valve guide for the control valve. The space left between the external surface of a temperature sensing element and the internal surface of the casing for the temperature sensing element is so narrow as to be adapted to allow the temperature sensing element to quickly respond to a change in the water temperature. A spring engages at opposite ends against a main valve and the control valve so as to bias the control valve against a valve seat.

6 Claims, 10 Drawing Figures

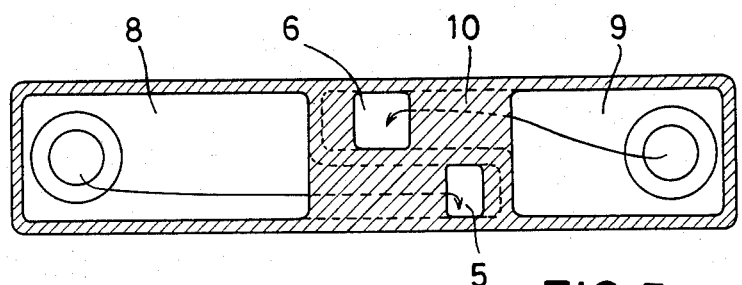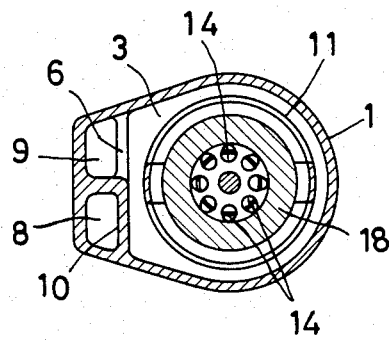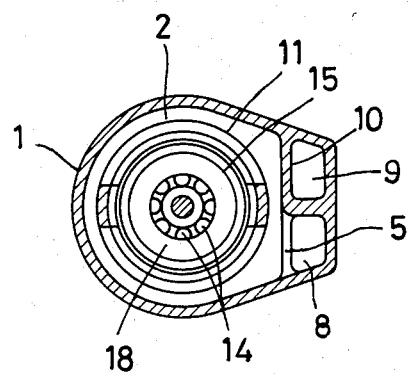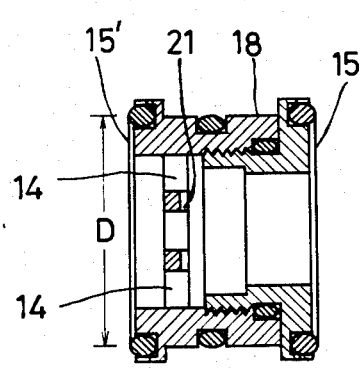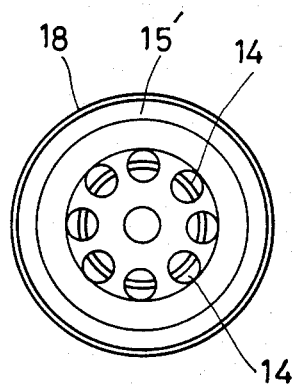

FIXTURE FOR THERMOSTATICALLY MIXING HOT AND COLD WATER

BACKGROUND OF THE INVENTION

1. Field of the Invention

The present invention relates to an improvement in a fixture for mixing hot and cold water from hot- and cold-water pipes so as to automatically regulate the temperature of mixed water discharged from a faucet.

2. Description of the Prior Art

The Japanese Laid-open patent publication No. 57-127171 discloses a known fixture of this type in which when a temperature sensing element senses a difference between the temperature of hot water and that of cold water, a valve is actuated thereby so as to control the temperature of hot water discharged from a faucet. FIG. 2 of this publication is included as FIGS. 9 and 10 in the accompanying drawings, in which a valve casing 50 includes a cold-water supply chamber 52, a hot-water supply chamber 51 which is partitioned from the cold-water supply chamber 52 by a partition wall 65, a mixed-water chamber 53, and an elongate tubular body 54 which is journalled within the mixed-water chamber 53. The left end of the elongate tubular body 54 constitutes a valve seat 56 through which cold water is admitted into the body 54 from the cold-water supply chamber 52. A blank cap 59 is screwed into a tapped hole 58 provided in the side wall of the hot-water supply chamber 51. The inner end of the blank cap 59 constitutes a valve seat 57. A hole 63 provided in the partition wall 65 serves as a valve guide for a stubby control valve 60 which is interposed between the valve seats 56 and 57. A casing 61 which accommodates a temperature sensing element 64 (FIG. 10 only) fits in the elongate tubular body 54. A hole 62 provided off-center in the left end wall of the casing 61 is in alignment with one of a plurality of holes 55 provided in the hub of the control valve 60 so that when the left annular surface of the control valve 60 is detached from the valve seat 57, hot water may be allowed to flow from the hot-water supply chamber 51 into the casing 61 so as to come in contact with the temperature sensing element 64.

This prior art fixture has a disadvantage that, during the passage of hot and cold water therethrough, the control valve 60 is apt to be pushed toward the low-pressure side. This is caused by the fact that there is a difference between the diameter D of the hole 63 and the diameter $D_1$ of the circles formed by both ends of the control valve 60 on one hand, and by the fact that the control valve 60 is stubby on the other hand.

The above-described prior art fixture has another disadvantage in that the temperature sensing element 64 is not sensitive enough and it takes so much time for the control valve 60 to regulate the flow rate that a great loss of water is incurred. Such a low sensitivity is caused by the water current running slowly through an excessively large space T left between the internal surface of the casing 61 and the external surface of the temperature sensing element 64.

It is an object of the present invention to provide a fixture which eliminates the above-mentioned disadvantages.

SUMMARY AND OBJECTS OF THE INVENTION

It is an object of the present invention to provide a fixture in which the diameters of the annular axes of seals provided on both ends of a control valve are equal to the inside diameter of the valve guide for the control valve so as to free the control valve from differential pressure which would cause a movement of the control valve toward the low-pressure side and so as to adapt the control valve for accurately cutting off the discharge of water and preventing leakage.

It is another object of the present invention to provide a fixture in which the space left between the external surface of the temperature sensing element and the internal surface of the casing for the temperature sensing element is so narrow as to be adapted for allowing the temperature sensing element to quickly respond to a change in the water temperature.

The fixture in accordance with the present invention is characterized in that the downstream portions of two passageways through which hot and cold water are fed to hot- and cold-water supply chambers, respectively, lie one upon another, that the hot- and cold-water supply chambers and a mixed-water chamber coaxially fall in line with each other so as to run parallel with the hot- and cold-water passageways, that the diameters of the annular axes of annular seals provided on both ends of a cylindrical control valve are equal to the external diameter of the control valve, that a casing which accommodates a temperature sensing element is provided with a plurality of projections on the side facing the control valve so as to allow a plurality of recesses to alternate with the projections, that one end of the temperature sensing element projects from the casing so as to slightly come into the control valve, that a spring engages at opposite ends against the main valve and the control valve so as to bias the latter away from the former, and that the casing, together with the temperature sensing element accommodated therein, is biased against the control valve by another spring in such a manner that the second spring operates in opposition to the first spring so as to allow the two springs to normally hold the control valve in balance, this balance being adapted to be upset when the temperature sensing element works in response to a change in the water temperature so as to allow the control valve to properly regulate the flow rates of hot and cold water.

BRIEF DESCRIPTION OF THE DRAWINGS

A preferred embodiment of the present invention is hereinafter described with reference to the accompanying drawings, in which:

FIG. 3 is a sectional view taken along line III—III of FIG. 1;

FIG. 4 is a sectional view taken along line IV—IV of FIG. 2;

FIG. 5 is a sectional view taken along line V—V of FIG. 2;

FIG. 6 is an enlarged sectional view of a control valve in accordance with the present invention;

FIG. 7 is a side view thereof;

DETAILED DESCRIPTION OF THE PREFERRED EMBODIMENT

Figure 1:
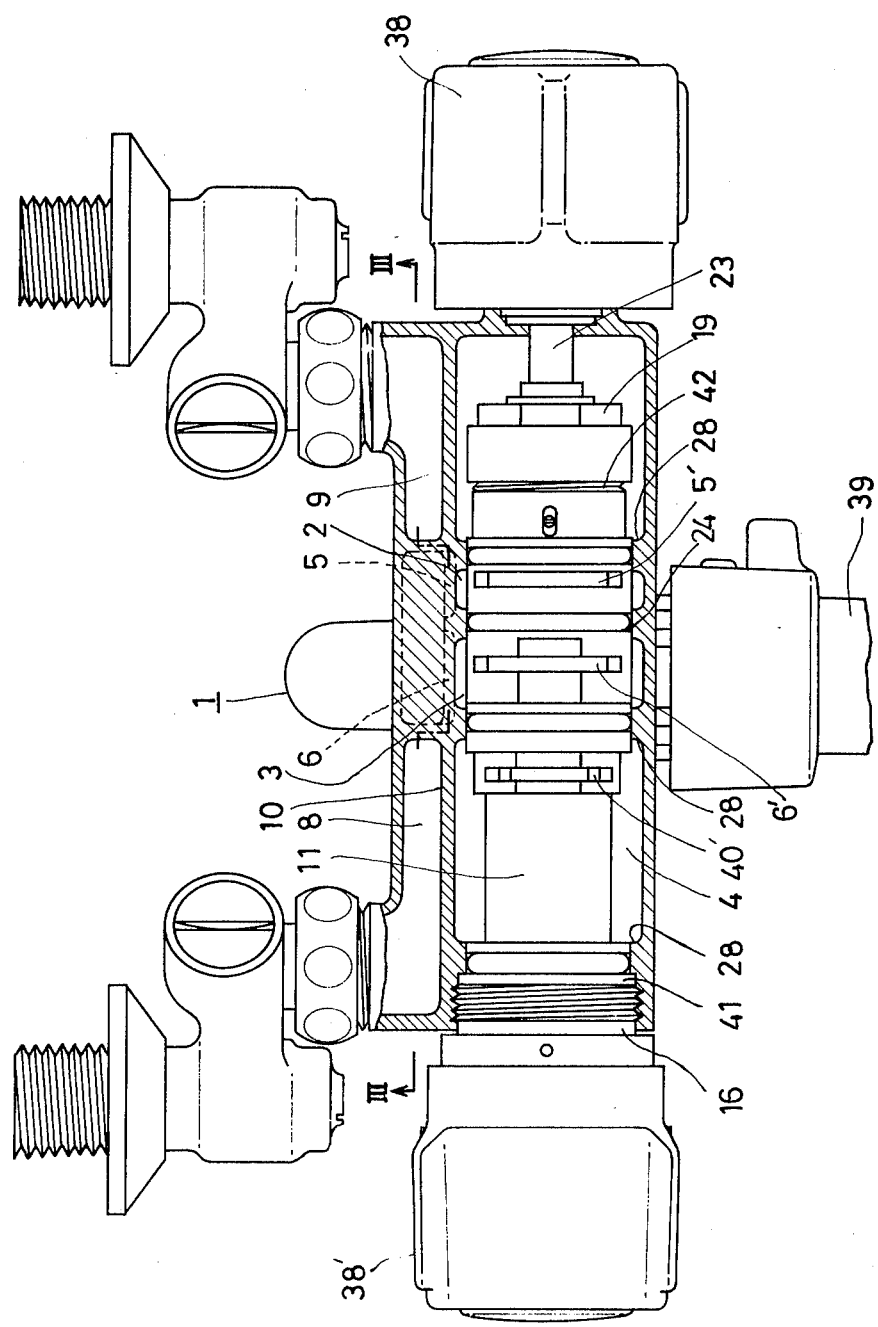
FIG. 1 is a partially cutaway plan view of a fixture in accordance with the present invention.

Referring now to FIGS. 1 to 5, a fixture in accordance with the present invention includes a valve casing 1 in which a hot-water supply chamber 2, a cold-water supply chamber 3 and a mixed-water chamber 4 are formed coaxially with one another and partitioned from one another by inward flanges 28. Hot water is fed to the hot-water supply chamber 2 through a hot-water passageway 8 which communicates with the chamber 2 by a hot-water inlet 5. Cold water is fed to the cold-water supply chamber 3 through a cold-water passageway 9 which communicates with the chamber 3 by a cold-water inlet 6. The hot- and cold-water passageways 8 and 9 are partitioned from the chambers 2, 3 and 4 by a partition wall 10 in such a manner that the passageways 8 and 9 run parallel with the chambers 2, 3 and 4 in the axial direction of the valve casing 1. The downstream portions of the passageways 8 and 9 lie one upon another as shown in FIG. 3.

Figure 2:
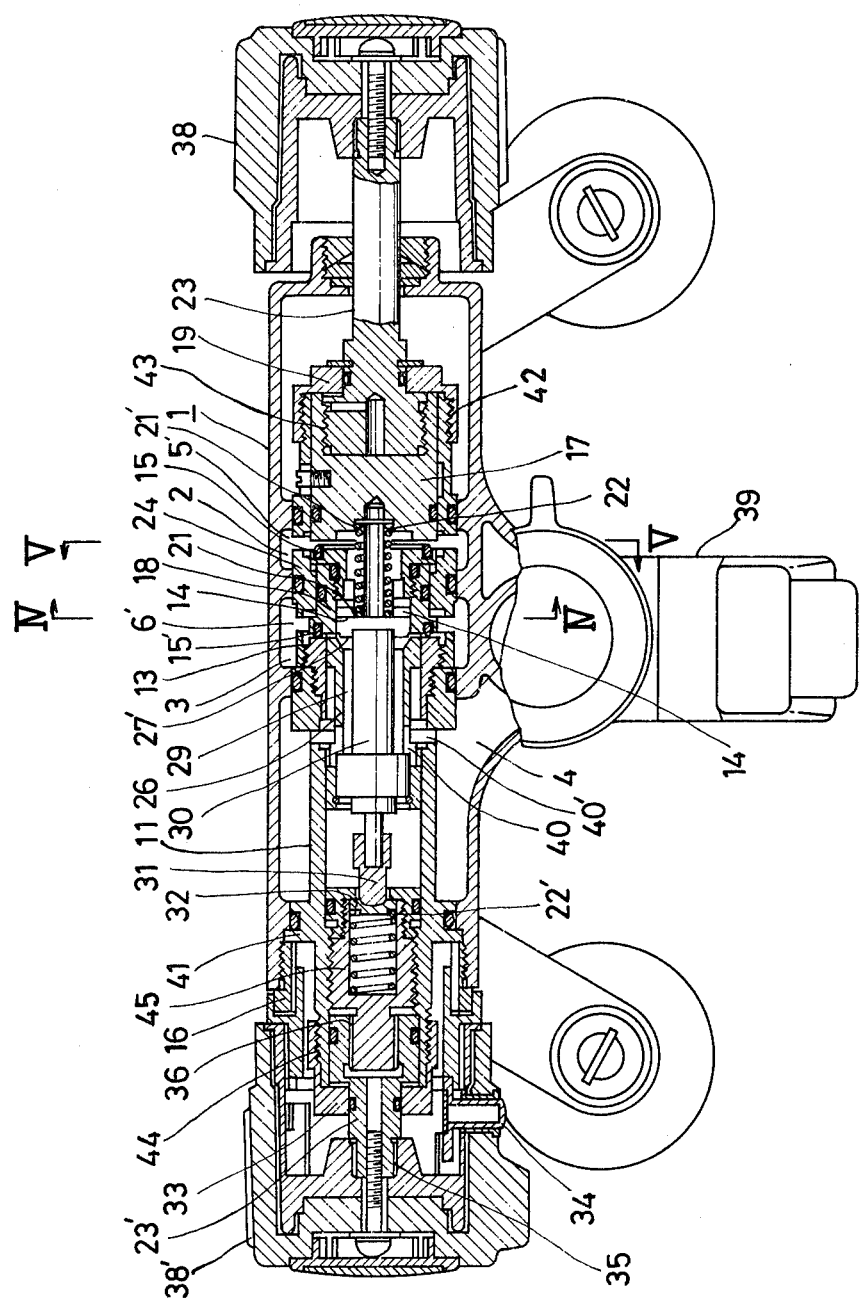
FIG. 2 is a vertical sectional front view thereof.

In FIG. 2, a valve chest 24, in which a main valve 17 and a cylindrical control valve 18 are slidably accommodated, fits in the inward flanges 28 shown in FIG. 1. Hot water flows from the hot-water supply chamber 2 into the valve chest 24 through a hot-water inlet 5', while cold water flows from the cold-water supply chamber 3 into the valve chest 24 through a cold-water inlet 6'.

The right-hand end of the valve chest 24 is provided with a screw thread 42, and a cap nut 19 is screwed on the screw thread 42 (FIGS. 1 and 2). A valve spindle 23 extends through a hole axially provided in the center of the cap nut 19. One end of the valve spindle 23 is screwed into a tapped hole 43 (FIG. 2 only) axially provided in the main valve 17, while the other end of the valve spindle 23 is provided with a knob 38. By turning the knob 38, the main valve 17 can be axially moved so as to be pressed against the control valve 18. Thus, the knob 38 can be used for manually interrupting the flow of water.

The left-hand end of the valve chest 24 is connected with the right-hand end of an elongate tubular body 11 which extends through the mixed-water chamber 4 (FIGS. 1 and 2). The end of the tubular body 11 disposed within the valve chest 24 is formed into a valve seat 13 on which the control valve 18 is adapted to rest. The tubular body 11 has an outward flange 41. A plug 16 is threaded into the left-hand end of the casing 1 so as to press the outward flange 41 against an annular shoulder formed by the extreme left inward flange 28 as viewed in FIG. 1. The tubular body 11 extends further leftwardly through the plug 16. The portion of the tubular body 11 projecting from the plug 16 is provided with a screw thread 44, and a cap nut 33 is screwed on the screw thread 44. A spindle 23' extends through a hole axially provided in the center of the cap nut 33. The external end of the spindle 23' is coupled with a knob 38' by means of a spline 35, while its internal end is coupled with a plug 45 by means of a spline 36. The plug 45 is threaded into the tubular body 11.

An apertured washer 21 is seated in the left-hand end of the control valve 18 in FIG. 2, and a spring 22 engages at opposite ends against the washer 21 and an annular shoulder 21' provided in the main valve 17 so as to bias the control valve 18 against the valve seat 13.

Referring now to FIG. 2, the control valve 18 is provided with an annular seal 15 on the side facing the main valve 17 and another annular seal 15' on the side facing the valve seat 13. In FIG. 6, the diameters D of the annular axes of the seals 15 and 15' are equal to the external diameter of the control valve 18.

In FIG. 2, a plurality of holes 14 are provided in the control valve 18 in parallel with the axis thereof so that while the annular seal 15 is apart from the main valve 17, hot water may be allowed to flow from the hot-water supply chamber 2 into the casing 26 through the hot-water inlet 5' and the holes 14. Likewise, while the annular seal 15' is apart from the valve seat 13, cold water is allowed to flow from the cold-water supply chamber 3 into the casing 26 through the cold-water inlet 6'.

Figure 8:
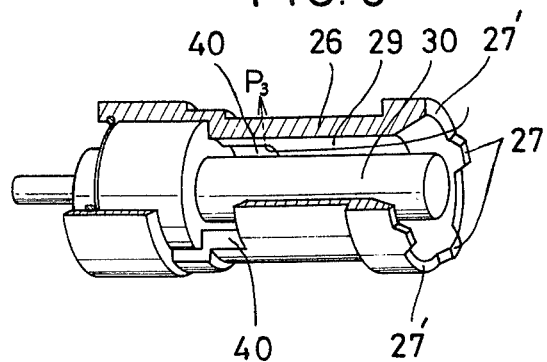
FIG. 8 is an enlarged, partially cutaway perspective view of a casing which accommodates a temperature sensing element in accordance with the present invention.
Figure 9:
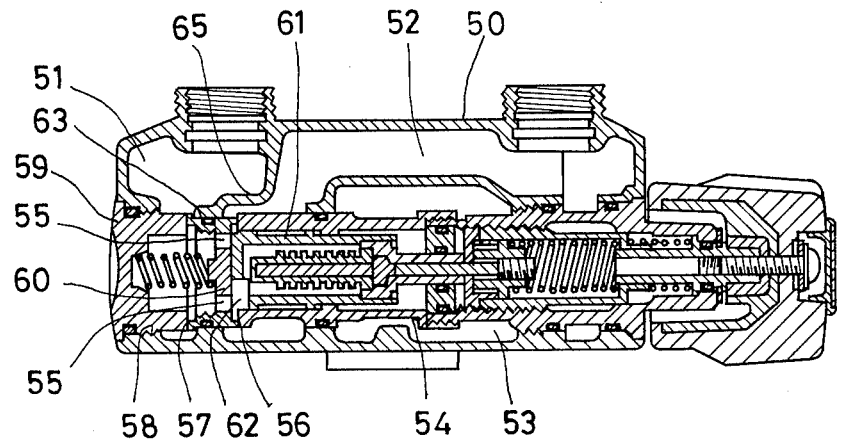
FIG. 9 is a horizontal sectional view of a prior art fixture.
Figure 10:
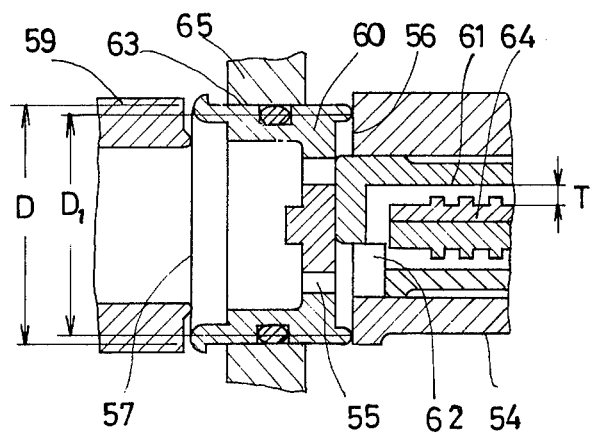
FIG. 10 is an enlarged view of a part thereof.

Referring now to FIGS. 2 and 8, a casing 26 slidably fits in the elongate tubular body 11 (FIG. 2 only) and accommodates a temperature sensing element 30 which is filled with a liquefied or gaseous temperature sensing medium. The casing 26 is provided with a plurality of projections 27 on the side facing the control valve 18 (FIG. 2 only) so as to allow a plurality of recesses 27' to alternate with the projections 27. The recesses 27' serve to allow the temperature sensing element 30 to be highly sensitive in the early stage of a change in the water temperature. One end of the temperature sensing element 30 projects from the casing 26 so that when the annular seal 15' (FIG. 2) abuts the valve seat 13 (FIG. 2 only) the end of the temperature sensing element 30 may slightly come into the control valve 18. The water current runs through a narrow space 29 left between the internal surface of the casing 26 and the external surface of the temperature sensing element 30 and flows out of the casing 26 through outlets 40, such water current being indicated by the arrow $P_3$ in FIG. 8. The throttling effect of the casing 26 serves to allow the temperature sensing element 30 to be highly sensitive.

In FIG. 2, a push rod 31 is adapted to operate the casing 26. The plug 45 is provided with a bore in which a disc 32 with a cupped surface for holding against the left-hand end of the push rod 31 is axially slidable. The disc 32 is biased to the right by a spring 22'. This spring 22' operates in opposition to the spring 22, and the two springs normally hold the control valve 18 in balance. This balance is adapted to be upset when the temperature sensing element 30 works in response to a change in the temperature of water passing through the space 29. The control valve 18 is actuated thereby to regulate the flow rates of hot and cold water. The numeral 34 designates a push button for a safety device (not shown).

The operation of the invention is described hereinafter. The parts normally occupy the positions shown in FIG. 2. Hot water is fed to the hot-water supply chamber 2 through the hot-water passageway 8 (FIG. 1) and hot-water inlet 5, flows from the chamber 2 into the valve chest 24 through the hot-water inlet 5', flows then into the casing 26 through the holes 14, keeps in contact with the surface of the temperature sensing element 30 while running through the narrow space 29, flows from the casing 26 into the mixed-water chamber 4 through the outlets 40 provided in the casing 26 and through outlets 40' provided in the elongate tubular body 11, and is discharged from a faucet 39.

The temperature sensing element 30 quickly works when it senses a change in the temperature of hot water which is being supplied to the mixed-water chamber 4 through the space 29. Then the temperature sensing element 30 expands toward, and gives a push to, the control valve 18. Then the space between the control valve 18 and the main valve 17 is narrowed, while the annular seal 15' of the control valve 18 is detached from the valve seat 13. Consequently, cold water which has flowed from the cold-water supply chamber 3 into the valve chest 24 through the cold-water inlet 6', is allowed to flow into the casing 26 and mixed with the hot water during passage through the space 29. Then the mixed water flows from the casing 26 into the mixed-water chamber 4 through the outlets 40 and 40', and is discharged from the faucet 39.

During the time when the annular seal 15' of the control valve 18 is only slightly apart from the valve seat 13, cold water flows into the casing 26 through the recesses 27' so that a drop in the water temperature caused by the inflow of the cold water may be sensed by the temperature sensing element 30 at an early stage of the temperature drop. Then the temperature sensing element 30 contracts and thereby regulates the space between the control valve 18 and the main valve 17 so that mixed water with a moderate temperature will be discharged from the faucet 39.

The above-described temperature control is facilitated by the facts that the casing 26 and the temperature sensing element 30 are resiliently biased to the right by the spring 22' and that the spring 22 operates in opposition to the spring 22' so as to resiliently hold the control valve 18 in balance.

If fine control is desired, the knob 38' is manipulated so as to screw the plug 45 inwardly. Then the spring 22' is compressed and comes to apply pressure to the casing 26 and the temperature sensing element 30 through the disc 32 and the push rod 31 so as to reduce the range within which the control valve 18 can move.

In order to decrease the flow rate of mixed water discharged from the faucet 39, the knob 38 is manually operated so as to narrow the space between the control valve 18 and the main valve 17.

In order to interrupt the flow of water, the knob 38 is manipulated so as to move the main valve 17 leftwardly as viewed in FIG. 2. Then the main valve 17 is pressed against the control valve 18 so that hot and cold water will be intercepted on the outside of the annular seals 15 and 15', respectively.

The present invention has the following advantages:

(1) The place where the hot water is intercepted is kept separate from the place where the cold water is intercepted. This construction precludes the possibility that the cold water, which has a higher inlet pressure than the hot water, flows backward into the water heater and thereby incurs a heat loss and/or puts out the pilot burner.

(2) Both sides of the control valve 18 are under an equal water pressure, because the diameters D (FIG. 6) of the annular axes of the seals 15 and 15' are equal to the external diameter of the control valve 18. Thus, the control valve 18 is free from differential pressure which would cause a movement of the control valve 18 toward the low-pressure side and make it difficult for the fixture to maintain a preset temperature.

(3) If a deposit is formed on, or a foreign substance sticks to, the surfaces of the main valve 17 (FIG. 2 only) control valve 18 and/or valve seat 13 so much as to hinder the fine control of hot water temperature, such a deposit or foreign substance can be washed off by manipulating the knob 38 so as to reciprocate the main valve 17 several times during the discharge of mixed water from the faucet 39.

(4) Because of the provision of recesses 27' and narrow space 29, the temperature sensing element 30 is adapted to quickly respond even to an abrupt manipulation of the knob 38 so as to assure smoothness in effecting the temperature control.

(5) As compared with the conventional fixtures, there is no possibility that the knobs 38 and 38' are operated in a wrong manner. Simple construction of the fixture in accordance with the present invention increases the productivity and drastically decreases distribution costs such as transportation and packaging costs.

While a preferred embodiment of the present invention has been disclosed, it is to be understood that it is described by way of example only and not in a limiting sense and the scope of the present invention is determined by the following claims.

What is claimed is:

1. A fixture for thermostatically mixing hot and cold water from hot- and cold-water pipes, comprising:
    a hot water supply chamber to which hot water is fed from said hot-water pipe,
    a cold-water supply chamber to which cold water is fed from said cold-water pipe,
    a mixed-water chamber communicating with said two chambers and formed coaxially therewith,
    a valve chest accommodated in said hot-water supply chamber and said cold-water supply chamber and communicating with these two chambers through a hot-water inlet and a cold-water inlet, respectively,
    a main valve and a control valve slidably accommodated in said valve chest,
    an elongate tubular body accommodated in said mixed-water chamber and connected with said valve chest, one end of said elongate tubular body, which end is disposed within said valve chest, being formed into a valve seat on which said control valve is adapted to rest,
    a casing slidably fitting in said elongate tubular body,
    a temperature sensing element accommodated in said casing, and
    spring means for engaging at opposite ends against said main valve and said control valve so as to bias said control valve against said valve seat.

2. The fixture as set forth in claim 1, wherein said control valve is provided with an annular seal on the side facing said main valve and another annular seal on the side facing said valve seat, the diameters of the annular axes of said seals being equal to the external diameter of said control valve.

3. The fixture as set forth in claim 1, wherein said casing is provided with a plurality of projections on the side facing said control valve so as to allow a plurality of recesses to alternate with these projections.

4. The fixtures as set forth in claim 1, wherein the space left between the internal surface of said casing and the external surface of said temperature sensing element is narrow.

5. The fixture as set forth in claim 3, wherein one end of said temperature sensing element projects from said casing so that when said another annular seal abuts on said valve seat, said one end of said temperature sensing element will slightly come into said control valve.

6. The fixture as set forth in claim 1, further comprising a push rod, one end of said push rod being connected with said casing on the side reverse to the side facing said control valve, a plug threaded into said elongate tubular body and provided with a bore in which a means for holding the other end of said push rod is axially slidable, a spindle coupled with said plug at one end and projecting externally at the other end, and a knob provided on the external end of said spindle.

* * * * *